3,157,530
COATING REGENERATED CELLULOSE FILM AND
PROCESS FOR MAKING SAME
William Paul Kane, Bon Air, Va., assignor to E. I. du
Pont de Nemours and Company, Wilmington, Del., a
corporation of Delaware
No Drawing. Filed Nov. 2, 1961, Ser. No. 149,503
15 Claims. (Cl. 117—76)

This invention relates to the manufacture of polymeric, non-fibrous, flexible films such as cellulosic films, particularly suited for conversion to bags, containers and similar packages. More particularly, it relates to the manufacture of such films coated with polymers of ethylenically unsaturated hydrocarbons.

This application is a continuation-in-part of my U.S. patent application, Serial Number 660,463, filed May 21, 1957, now abandoned.

For several reasons, films composed of the polymers derived from the ethylenically unsaturated hydrocarbons (polyethylene, polypropylene and polystyrene) have never seriously encroached on the market for packaging films such as regenerated cellulose film. In thicknesses necessary for packaging films, these polyhydrocarbon films are limp and tend to exhibit haziness where transparency, clarity and high gloss are desired. Their limpness and thermoplasticity make the films difficult to handle in standard packaging machinery. The surfaces of such films do not retain printed information satisfactorily.

These polymeric films do exhibit outstanding flexibility, tear strength, resistance to deterioration by greases and oils, abrasion resistance and low moisture permeability. These properties have made the polyhydrocarbons, particularly polyethylene, useful in some packaging operations and potentially useful as a coating for other non-fibrous films such as regenerated cellulose film. But as a coating, the polyhydrocarbons have never realized their full potentiality. The reason—the adhesion between the polyhydrocarbons and films such as regenerated cellulose film is so poor as to render the combination practically useless. Various adhesion promoters have been suggested. When high relative humidity conditions are encountered, most of them fail. Other adhesion promoters, although improving adhesion, tend to add a blush or haze problem to the manufacturer's problems.

It is an object of the present invention to provide a polyhydrocarbon composition which, when applied as a coating, will adhere tenaciously to a variety of non-fibrous, flexible base sheets even under high relative humidity conditions. Another object is to provide a final film in which the desirable properties of the base sheet and the desirable properties of the polyhydrocarbons are retained. Other objects will appear hereinafter.

The objects are accomplished by providing a non-fibrous, flexible base sheet such as regenerated cellulose film coated with a composition comprising essentially 80–99% of a polyhydrocarbon, preferably a polymer of an ethylenically unsaturated hydrocarbon such as polyethylene, 0.5–10% of a compound having a plurality of —N=C=X groups wherein X is a chalcogen (Journal American Chemical Society, 63, p. 892 (1941)) of atomic weight less than 35 such as toluene diisocyanate and 0.5–10% of cyclized natural rubber.

The term "polyhydrocarbon," unless otherwise modified, as used throughout the specification, is intended to be used in its usual and accepted generic sense. The preferred hydrocarbon polymers for use in this invention are the polymers of ethylenically unsaturated alpha olefins not limited to mono-olefins but include dienes, trienes, etc., and/or copolymers thereof. Some of the most useful polymers include polyethylene, polypropylene, polyisobutylene, polymethylene, polybutadiene, polynorbornylene, polystyrene and polymethylstyrene.

The preferred coating composition comprises 90–99% of polyethylene, 0.5–5% of "Pliolite NR"[1] and 0.5–5% of an organic compound having a plurality of —N=C=X groups wherein X is a chalcogen of atomic weight less than 35.

The polyethylene used for the purpose of this invention is the normally solid, crystalline polymer of the formula: $(CH_2)_x$. It is formed by the polymerization of ethylene in any known manner, cf. U.S. Patent 2,153,553.

The preferred cyclized natural rubber, "Pliolite NR," is prepared by treating natural rubber with stannic chloride or chlorostannic acid. (See Paper Trade Journal, page 96, February 23, 1929; Journal Industrial Engineering Chemistry, XIX, 1033, XXVI, 125, XXXIII, 389; and U.S. Patents 1,797,188, 1,846,247, 1,853,334, and 2,052,391.) The chemical structure is described in Rubber Age, April 1939.

The preferred poly-N=C=X compounds are the diisocyanates and reaction products of diisocyanates with polyglycols, polyesters, polyamides and polyamines at a molar ratio of at least 2 moles of diisocyanate to 1 mole of the latter compounds. The requirement is for an excess of —N=C=X groups over the —OH or —NH groups, so that at least two of the original —N=C=X groups will remain as such in the condensation product. A preferred composition might be two equivalents of a polyisocyanate to one equivalent of polyol. The reaction products are polyisocyanates with intermediate urethane linkages further characterized by a molecular weight of 200 to 10,000.

The composition, in condition suitable for coating, is most easily prepared by dissolving the solids, i.e., the polyhydrocarbon, the poly-N=C=X compound and cyclized natural rubber in a common volatile organic solvent, e.g., toluene, or in a mixture of solvents. The polyhydrocarbon should comprise from 80% to 99% by weight of the solids content of the coating composition, and the cyclized natural rubber and the poly-N=C=X compound should each comprise from 0.5% to 10% of the solids content of the composition. Concentrations of the poly-N=C=X compound or cyclized natural rubber in excess of 10% give cloudy coatings which indicate incompatability between the polymers above this level. Such compositions also tend to remain tacky and are difficult to dry. If less than 0.5% of either cyclized natural rubber or the poly-N=C=X compound is used, the adhesion is poor and the advantageous results of this invention are not realized. It is to be understood, of course, that any other suitable method for combining the essential ingredients of the composition may be employed, such as melt mixing, milling, dispersing in aqueous medium (water), etc. The composition, however, prepared, may be coated on one or both sides of the non-fibrous base sheet by dip, spray, melt extrusion, or any other convenient coating expedient.

Because of the wide use and commercial importance of regenerated cellulose film as a wrapping material, the description of the invention will mostly concern coating regenerated cellulose film. The regenerated cellulose

---

[1] A product of the Goodyear Tire & Rubber Co.

film used in the invention may have been prepared by the viscose process, the cuprammonium process or other processes.

Although the polyhydrocarbon coating compositions of this invention adhere strongly to the non-fibrous base sheets without the necessity of an intermediate anchor coating, or the incorporation in the base sheet of an agent which functions to bond the protective coating to the base sheet, the application of the coating compositions described herein to base films modified by the addition of an intermediate anchor coat or agent, is not to be regarded as outside the scope of this invention. In the case of regenerated cellulose base sheets, in particular, it is of advantage, especially when the coated sheet is to be subjected to conditions of high moisture, to employ any of the known means for improving coating adhesion, e.g., the application of an anchor sub-coat as disclosed in Jebens U.S.P. 2,280,829, or by impregnating the base sheet prior to coating with an anchoring agent of thermosetting resin such as a urea-aldehyde resin, phenol-formaldehyde resin, ketone-aldehyde resin, amine modified urea-aldehyde resin, alcohol modified urea-aldehyde resin, etc., disclosed, for example, in Charch and Bateman, U.S. Patent 2,159,007; Ellis, U.S. Patent 2,523,868; and Chapman, U.S. Patent 2,533,557.

The invention will be more clearly understood by referring to the descriptive material and the examples which follow. Unless otherwise stated, all parts and percentages given in the examples are by weight. It should be understood that the examples, although illustrating specific embodiments of the present invention, should not be considered limitative.

For convenience, abbrevations and commercial names have been used in the tables accompanying the examples. PE represents polyethylene, PS, polystyrene; PP, polypropylene, S/IB, a copolymer from 50% styrene and 50% isobutylene; Pl, "Pliolite NR"; Alp, "Alpex" cyclized rubber manufactured by Alkydol Laboratories, Inc.; TDI, 2,4-toluene diisocyanate; MDI, 4,4'-diphenylmethane diisocyanate; RCD 2027, a polyurethane with isocyanate end groups manufactured by E. I. du Pont de Nemours & Co.; DV-4678, a polyurethane with isocyanate end groups formed from the reaction of 1 mole of trimethylol ethane with 3 moles of 2,4-toluene diisocyanate, manufactured by E. I. du Pont de Nemours & Co.; DV-4680, a polyurethane with isocyanate end groups formed from the reaction of 1 mole of trimethylol propane with 3 moles of 2,4-toluene diisocyanate, manufactured by E. I. du Pont de Nemours & Co.; DV-4681, a trimer of 2,4-toluene diisocyanate, manufactured by E. I. du Pont de Nemours & Co.; and MC, "Mondur" C, a polyurethane with isocyanate end groups formed from the reaction of 1 mole of trimethylol propane with 3 moles of 2,4-toluene diisocyanate, manufactured by the Mobay Chemical Co.

EXAMPLES I–III

A solution was prepared by dissolving 95 parts of polyethylene, 5 parts of "Pliolite NR" and 5 parts of toluene diisocyanate in 400 parts of toluene at 100°–105° C. A base film of regenerated cellulose approximately 1 mil thick was unwound from a roll, passed over a tension roll, then over a guide roll into a tank containing the coating solution. The coated film was then passed between two "doctor" rolls which served to smooth the coating and to regulate its thickness. The coated film was dried in a tower maintained at a temperature between 145° C. and 185° C. The coating weight was approximately 4 grams/square meter.

For Examples II and III the above procedure was duplicated with different coating compositions: 95 parts of polyethylene, 5 parts of "Pliolite NR" and only 1 part of toluene diisocyanate in Example II, and 95 parts of polyethylene, 1.6 parts of "Pliolite NR" and 2 parts of toluene diisocyanate in Example III.

As controls, 95 parts of polyethylene in 400 parts of toluene was used as Control A and 95 parts of polyethylene and 5 parts of "Pliolite NR" in 400 parts of toluene was used as the coating composition in Control B. The coating procedures were identical to that described above.

In Table 1 the peel heat-seal strength, the adhesion in air (strip test) and the adhesion in direct contact with water (anchorage) are compared for the 5 coated films. The details for measuring these properties are as follows:

Peel heat-seal strength is a measure of the strength of the bond between two films when they are sealed together by heat and pressure. A piece of the coated film 4" x 10" with the grain running in the long direction is cut into two pieces 4" x 5". The two pieces are superimposed so that opposite surfaces are in contact. The two pieces of superimposed film are then sealed together at each end at right angles to the grain. A ¾" wide sealing bar heated to a temperature of 130° C. contacts the ends for 2 seconds at a pressure of 20 p.s.i. The sealed sheets are then cut in half at right angles to the grain. From the center of the four resulting pieces 1½" wide strips parallel to the grain are cut. The four sets of strips are then conditioned for 48 hours at 34° C. and 81% relative humidity. They are tested by opening each set of strips at the free ends, placing them in a Suter testing machine and pulling them apart. The force in grams required to separate the seal after it has been ruptured is the peel heat-seal strength.

The strip test provides a rough indication of adhesion. It is measured by placing a pressure-sensitive cellulose film tape on the coated film; applying thumb pressure; and then stripping the tape from the coated film. Coatings having good adhesion remain firmly attached to the base sheet and are not stripped off with the pressure-sensitive tape. The percent of the coating stripped from the film is recorded.

Anchorage refers to the adhesion of the coating to the base film when in direct contact with water. Samples of the coated film are suspended in water at 25° C. for 60 hours and then graded approximately as follows:

Grade 1—no blisters
Grade 2—few blisters
Grade 3—decided blistering
Grade 4—coating sloughs off at blistered or unblistered portions

*Table 1*

PROPERTIES OF COATED REGENERATED CELLULOSE FILMS OF EXAMPLES I–III COMPARED TO TWO CONTROLS

| Example | Composition (percent by wt.) | Peel Heat-Seal Strength | Strip Test (percent stripped) | Anchorage |
|---|---|---|---|---|
| I | 90.5PE–4.75Pl–4.75TDI | 350 | 0 | 1 |
| II | 94PE–5Pl–1TDI | 300 | 0 | 1 |
| III | 96.5PE–1.5Pl–2TDI | 325 | 0 | 1 |
| Control A | 100PE | 0 | 100 | 4 |
| Control B | 95PE–5Pl | 25 | 100 | 4 |

EXAMPLES IV–VI

Examples I–III were repeated except that the gel regenerated cellulose film was first impregnated (in the softener bath) with an anchoring agent, a guanidine-urea-formaldehyde resin. The resin had been obtained by reacting together about 0.04 mole of guanidine nitrate, about 2.3 moles of formaldehyde and about 1 mole of urea. The preparation of the resin and the manner of impregnating the regenerated cellulose film are substantially as described in Example I of U.S. Patent No. 2,533,557.

The resulting film, containing 0.3% by weight of resin based on the weight of the cellulose, was coated with solutions in 400 parts of toluene of the ingredients given in Examples I–III, as follows: For Example IV, 95PE, 5Pl and 5TDI; Example V, 95PE, 5Pl and 1TDI; Example VI, 95PE, 1.6Pl and 2TDI; Control A, 95PE; Control B, 95PE and 5Pl. The physical properties are compared in Table 2.

*Table 2*

PROPERTIES OF COATED, RESIN-IMPREGNATED REGENERATED CELLULOSE FILMS OF EXAMPLES IV–VI COMPARED TO TWO CONTROLS

| Example | Composition (percent by wt.) | Peel Heat-Seal Strength | Strip Test (percent stripped) | Anchorage |
|---|---|---|---|---|
| IV | 90.5PE–4.75Pl–4.75TDI | 500 | 0 | 1 |
| V | 94PE–5Pl–1TDI | 400 | 0 | 1 |
| VI | 96.4PE–1.6Pl–2TDI | 400 | 0 | 1 |
| Control A | 100 PE | 20 | 100 | 4 |
| Control B | 95PE–5Pl | 200 | 0 | 2 |

EXAMPLE VII

A resin-impregnated film (0.3% guanidine-urea-formaldehyde resin) similar to that used in Examples IV–VI was coated in the manner previously described with solutions in 900 parts of toluene. In Example VII, 95 parts PE, 5 parts Pl and 2 parts TDI were used and in the control, the TDI was omitted. The improvement in properties achieved by the use of the diisocyanate is independent of the amount of toluene used to prepare the solution as shown in Table 3.

*Table 3*

PROPERTIES OF COATED, RESIN-IMPREGNATED REGENERATED CELLULOSE FILM OF EXAMPLE VII COMPARED TO A CONTROL

| Example | Composition (percent by wt.) | Peel Heat-Seal Strength | Strip Test (percent stripped) | Anchorage |
|---|---|---|---|---|
| VII | 93.1PE–4.9Pl–2TDI | 450 | 0 | 1 |
| Control | 95PE–5Pl | 200 | 0 | 2 |

EXAMPLES VIII–XIV

For these examples, the type and the amount of the poly-N=C=X compound were varied. In all other respects (use of regenerated cellulose film, coating procedure, coating weight, 0.3% anchoring resin, 400 parts of toluene), the examples were performed in the manner described for Examples IV–VI. The control employed 95 parts PE and 5 parts Pl in 400 parts of toluene. To this was added 2 parts RCD 2027 for Example VIII; 6 parts RCD 2027 for Example IX; 2 parts DV–4678 for Example X; 2 parts MDI for Example XI; 6 parts MDI for Example XII; 4 parts DV–4681 for Example XIII; and 4 parts DV–4680 for Example XIV. The properties of the resulting films are presented in Table 4.

*Table 4*

PROPERTIES OF COATED, RESIN-IMPREGNATED REGENERATED CELLULOSE FILMS OF EXAMPLES VIII–XIV COMPARED TO A CONTROL

| Example | Composition (percent by wt.) | Peel Heat-Seal Strength | Strip Test (percent stripped) | Anchorage |
|---|---|---|---|---|
| VIII | 93.1PE–4.9Pl–2RCD 2027 | 225 | 0 | 1 |
| IX | 89.6PE–4.7Pl–5.7RCD 2027 | 550 | 0 | 1 |
| X | 93.1PE–4.9Pl–2DV–4678 | 400 | 0 | 1 |
| XI | 93.1PE–4.9Pl–2MDI | 350 | 0 | 1 |
| XII | 89.6PE–4.7Pl–5.7MDI | 450 | 0 | 1 |
| XIII | 91.4PE–4.8Pl–3.8DV–4681 | 400 | 0 | 1 |
| XIV | 91.4PE–4.8Pl–3.8DV–4680 | 400 | 0 | 1 |
| Control | 95PE–5Pl | 200 | 0 | 2 |

EXAMPLES XV–XVII

In Examples XV–XVII polyhydrocarbons other than polyethylene were used in preparing the coating composition. The solutions were prepared using 95 parts of the polyhydrocarbon, 5 parts Pl and 2 parts TDI in 900 parts of toluene and the coatings were applied to resin-impregnated regenerated cellulose films in the manner previously described. In the controls, the diisocyanate was omitted. The polyhydrocarbon in Example XV and Control A was a polymer prepared using 50% styrene and 50% isobutylene; in Example XVI and Control B, polypropylene; Example XVII and Control C, polystyrene. The results are presented in Table 5.

*Table 5*

PROPERTIES OF COATED, RESIN-IMPREGNATED REGENERATED CELLULOSE FILMS OF EXAMPLES XV–XVII COMPARED TO THREE CONTROLS

| Example | Composition (percent by wt.) | Peel Heat-Seal Strength | Strip Test (percent stripped) | Anchorage |
|---|---|---|---|---|
| XV | 93.1S/IB–4.9Pl–2TDI | 190 | 0 | 1 |
| Control A | 95S/IB–5Pl | 30 | 100 | 4 |
| XVI | 93.1PP–4.9Pl–2TDI | 230 | 0 | 1 |
| Control B | 95PP–5Pl | 75 | 100 | 4 |
| XVII | 93.1PS–4.9Pl–2TDI | 250 | 0 | 1 |
| Control C | 95PS–5Pl | 50 | 100 | 4 |

EXAMPLE XVIII

A coating solution was prepared similar to that shown in Example I; 95 parts PE, 5 parts Pl and 5 parts TDI in 400 parts of toluene, but with the addition of 2 parts of water to the composition. The composition was coated on a regenerated cellulose film and the coated film was tested in accordance with the procedure described in Example I.

The results are compared to a control in which the coating composition also contained 2 parts of water but in which the 5 parts of TDI were omitted. The water had substantially no influence on the effectiveness of TDI in the coating composition. The results are presented in Table 6.

*Table 6*

PROPERTIES OF COATED REGENERATED CELLULOSE FILM OF EXAMPLE XVIII, THE COATING CONTAINING WATER, COMPARED TO A CONTROL

| Example | Composition (percent by wt.) | Peel Heat-Seal Strength | Strip Test (percent stripped) | Anchorage |
|---|---|---|---|---|
| XVIII | 90.5PE–4.75Pl–4.75TDI | 300 | 0 | 1 |
| Control | 95PE–5Pl | 25 | 100 | 4 |

EXAMPLES XIX–XXII

In these examples, "Alpex" cyclized natural rubber was used instead of "Pliolite NR" in polyethylene coating compositions. In Examples XIX–XXI, "Mondur" C, a polyurethane with isocyanate end groups, was used. In Example XXII, 4,4'-diphenylmethane diisocyanate was used. Thus, Example XIX contained 95 parts PE, 3 parts Alp and 2 parts MC, in 600 parts of toluene; Example XX, 95 parts PE, 5 parts Alp and 2.5 parts MC, in 400 parts of toluene; Example XXIII, 92 parts PE, 3 parts Alp and 5 parts MC, in 400 parts of toluene; Example XXII, 85 parts PE, 10 parts Alp and 5 parts MDI, in 500 parts of toluene. The coatings were applied to resin-impregnated regenerated cellulose films in the manner previously described. The results, all very satisfactory, are presented in Table 7.

*Table 7*

PROPERTIES OF COATED, RESIN-IMPREGNATED REGENERATED CELLULOSE FILMS OF EXAMPLES XIX–XXII

| Example | Composition (percent by wt.) | Peel Heat-Seal Strength | Strip Test (percent stripped) | Anchorage |
|---|---|---|---|---|
| XIX | 95PE–3Alp–2MC | 325 | 0 | 1 |
| XX | 92.7PE–4.9Alp–2.4MC | 400 | 0 | 1 |
| XXI | 92PE–3Alp–5MC | 380 | 0 | 1 |
| XXII | 85PE–10Alp–5MDI | 375 | 0 | 1 |

The importance of the poly-N=C=X (X being a chalcogen of atomic weight less than 35) compounds in the polyhydrocarbon-cyclized natural rubber coating composition is illustrated in the foregoing examples. Adhesion, particularly under conditions of high humidity, is improved as much as twelve-fold over cases where the poly-N=C=X compound is omitted. When compared to cases where both the poly-N=C=X compound and the cyclized natural rubber are omitted, the improvement is even greater.

The most useful poly-N=C=X compounds, the di-N=C=X compounds, may be depicted by the general formula: X=C=N—Y—N=C=X, where X is a chalcogen of atomic weight less than 35 and Y is selected from the group consisting of a divalent hydrocarbon radical and a divalent polyurethane radical of molecular weight 80–9,900. These compounds include polymethylene diisocyanates and diisothiocyanates such as ethylene diisocyanate, trimethylene diisocyanate, dodecamethylene diisocyanate, hexamethylene diisocyanate, tetramethylene diisocyanate, pentamethylene diisocyanate, and the corresponding diisothiocyanates; alkylene diisocyanates and diisothiocyanates such as propylene-1,2-diisocyanate, 2,3-dimethyltetramethylene diisocyanate and diisothiocyanate, butylene-1,2-diisocyanate, butylene-1,3-diisothiocyanate, and butylene-1,3-diisocyanate; alkylidene diisocyanates and diisothiocyanates such as ethylidene diisocyanate and hyptylidene diisothiocyanate; cycloalkylene diisocyanates and diisothiocyanates such as 1,4-diisocyanatocyclohexane, cyclopentylene-1,3-diisocyanate, and cyclohexylene-1,2-diisothiocyanate; aromatic diisocyanates and diisothiocyanates and such as m-phenylene diisothiocyanate, p-phenylene diisocyanate, p-phenylene diisothiocyanate, 1-methyl-phenylene-2,4-diisocyanate, naphthylene-1,4-diisocyanate, o,o'-toluene diisocyanate, diphenyl-4,4'-diisothiocyanate and diisocyanate, benzene-1,2,4-triisothiocyanate, 5-nitro-1,3-phenylene diisocyanate, xylylene-1,4 diisocyanate, xylylene-1,3 diisocyanate, 4,4'-diphenylenemethane diisocyanate, 4,4'-diphenylenepropane diisocyanate and xylylene-1,4 diisothiocyanate; aliphaticaromatic diisocyanates and diisothiocyanates such as phenylethylene diisocyanate; the polyurethanes having isocyanate end groups such as the reaction product of 3 moles of 2,4-toluene diisocyanate with 1 mole of trimethylolethane; reaction product of 3 moles of 2,4-toluene diisocyanate with 1 mole of trimethylolpropane; reaction product of polyethylene glycol with a slight excess of 2,4-toluene diisocyanate; reaction product of polypentamethylene adipate with a slight excess of 2,4-toluene diisocyanate; reaction product of propylene oxide/ethylene oxide copolyether glycols with 2,4-toluene diisocyanate; reaction product of trimethylolpropane, polytetramethylene glycol with 2,4-toluene diisocyanate; polyureas derived from the reaction of amine-terminated polyamides plus 2,4-toluene diisocyanate and polyurea derived from the reaction of water with a slight excess of 2,4-toluene diisocyanate. Diisocyanates and diisothiocyanates containing heteroatoms, such as

SCNCH$_2$OCH$_2$NCS, SCNCH$_2$CH$_2$OCH$_2$CH$_2$NCS and SCN—N(R)—CS—N(R)—NCS are also useful in the invention. Acyl diisocyanates and diisothiocyanates such as suberyl, pimelyl, azelayl, brassylyl isocyanates and isothiocyanates may also be used. In fact, any diisocyanate, diisothiocyanate, or mixed isocyanate-isothiocyanate of the general formula XCNZNCX, in which X is oxygen or sulfur and Z is a divalent organic radical, will give improved products according to the present invention. This invention is not, however, limited to di-N=C=X compounds since organic compounds having a higher number of —N=C=X groups may be employed including 1,2,4-benzene triisothiocyanate and butane-1,2,2-triisocyanate, as well as the isothiocyanic or isocyanic esters of castor oil or hexahydro castor oil (glyceryl tris-hydroxy-stearate).

As the cyclized natural rubber, "Pliolite NR" and "Alpex" have been illustrated. The scope of this invention is not so limited but is meant to include the cyclized natural rubbers independent of their sources or method of preparation.

While the invention contemplates the use of the polyhydrocarbon, the poly-N=C=X compounds and a cyclized natural rubber as the essential constituents of the coatings, other ingredients may be added. The addition of pigments, dyes, delusterants, fillers, binders, plasticizers, etc., is therefore understood to be within the purview of this invention.

The compositions of the invention are preferably applied from a solution in an inert solvent. The solvent is preferably anhydrous, although this is not absolutely necessary as shown by Example XVIII. Hydrocarbons such as benzene, toluene, xylene or petroleum fractions are preferred solvents. Halogenated hydrocarbons, ethers, and tertiary amines may also be used.

Various procedures may be used to coat the non-fibrous, flexible base sheet. The sheet may be dipped into the coating solution or the solution may be sprayed, brushed, etc., on one or both sides of the sheet. The coated sheet is then permitted to dry by a step in which the solvent in the coating solution is driven off, usually in the case of most solvents by exposure to elevated temperatures.

It is believed that the improvement in adhesion is obtained by a complex reaction and the degree of improvement depends upon the reactivity of the polymers. The improvement is probably due to chemical and physical bonding. To what extent the improvement is due to chemical bonding and to what extent it is due to physical forces is not known.

The presence of water in the polyhydrocarbon seems to have little or no effect in the invention. Polyhydrocarbons which have been dried prior to incorporation in the coating composition are, surprisingly, no more effective in improving adhesion at high humidities than the polyhydrocarbons which have not been dried.

The coated regenerated cellulose films prepared in accordance with the present invention are useful in the packaging of foods, cigarettes, hardware, etc., in the preparation of adhesive and sound tapes, etc. In short, the coated films are useful wherever the base films or the base films coated with polyhydrocarbon coatings have been used heretofore.

As many widely different embodiments may be made without departing from the spirit and scope of this invention, it is understood that the invention is not limited except as defined in the appended claims.

What is claimed is:

1. A regenerated cellulose film having at least one surface coated with a composition consisting essentially of 80–99% of a polyhydrocarbon prepared by polymerizing at least one ethylenically unsaturated alpha olefin, 0.5–10% of a compound having a plurality of —N=C=X groups wherein X is a chalcogen of atomic weight less than 35, and 0.5–10% of a cyclized natural rubber.

2. A regenerated cellulose film impregnated with a thermo-set resin having at least one surface coated with a composition consisting essentially of 80–99% of a polyhydrocarbon prepared by polymerizing at least one ethylenically unsaturated alpha olefin, 0.5–10% of a compound having a plurality of —N=C=X groups wherein X is a chalcogen of atomic weight less than 35, and 0.5–10% of a cyclized natural rubber.

3. A regenerated cellulose film as in claim 2 wherein the thermo-set resin is a guanidine-urea-formaldehyde resin.

4. A regenerated cellulose film impregnated with a thermo-set resin having at least one surface coated with a composition consisting essentially of 90–99% of polyethylene, 0.5–5% of a diisocyanate and 0.5–5% of cyclized natural rubber.

5. A regenerated cellulose film impregnated with a thermo-set resin having at least one surface coated with a composition consisting essential of 90–99% of polyethylene, 0.5–5% of a polyurethane with isocyanate end groups having a molecular weight of 200–10,000, and 0.5–5% of cyclized natural rubber.

6. A coated regenerated cellulose film as in claim 1 wherein said polyhydrocarbon is polyethylene.

7. A coated regenerated cellulose film as in claim 1 wherein said polyhydrocarbon is polypropylene.

8. A coated regenerated cellulose film as in claim 1 wherein said polyhydrocarbon is polystyrene.

9. A coated regenerated cellulose film as in claim 1 wherein said polyhydrocarbon is a polymer obtained from 50% styrene and 50% isobutylene.

10. A coated regenerated cellulose film as in claim 1 wherein the poly-N=C=X compound is a diisocyanate.

11. A coated regenerated cellulose film as in claim 1 wherein the poly-N=C=X compound is 2,4-toluene diisocyanate.

12. A coated regenerated cellulose film as in claim 1 wherein the poly-N=C=X compound is 4,4'-diphenylmethane diisocyanate.

13. A coated regenerated cellulose film as in claim 1 wherein the poly-N=C=X compound is a polyurethane with isocyanate end groups having a molecular weight of 200–10,000.

14. A coated regenerated cellulose film as in claim 1 wherein the poly-N=C=X compound is the reaction product of 3 mols of 2,4-toluene diisocyanate and 1 mol of trimethylolpropane.

15. A process for coating regenerated cellulose film which comprises applying to said regenerated cellulose film a solution of 80–99% of a polyhydrocarbon prepared by polymerizing at least one ethylenically unsaturated alpha olefin, 0.5–10% of a compound having a plurality of —N=C=X groups wherein X is a chalcogen of atomic weight less than 35, and 0.5–10% of a cyclized natural rubber dissolved in a volatile organic solvent; removing excess solution from said film; smoothing said solution on said film and drying the coated film.

References Cited in the file of this patent
UNITED STATES PATENTS

| | | |
|---|---|---|
| 2,533,557 | Chapman | Dec. 12, 1950 |
| 2,726,171 | Morf | Dec. 6, 1955 |
| 2,876,067 | Nagel et al. | Mar. 3, 1959 |
| 2,911,321 | Herrmann et al. | Nov. 3, 1959 |
| 2,953,482 | Scherber | Sept. 20, 1960 |
| 3,027,343 | Kane | Mar. 27, 1962 |